J. W. WINKLEMAN.
SHADE AND CURTAIN BRACKET.
APPLICATION FILED NOV. 26, 1909.
995,392.
Patented June 13, 1911.
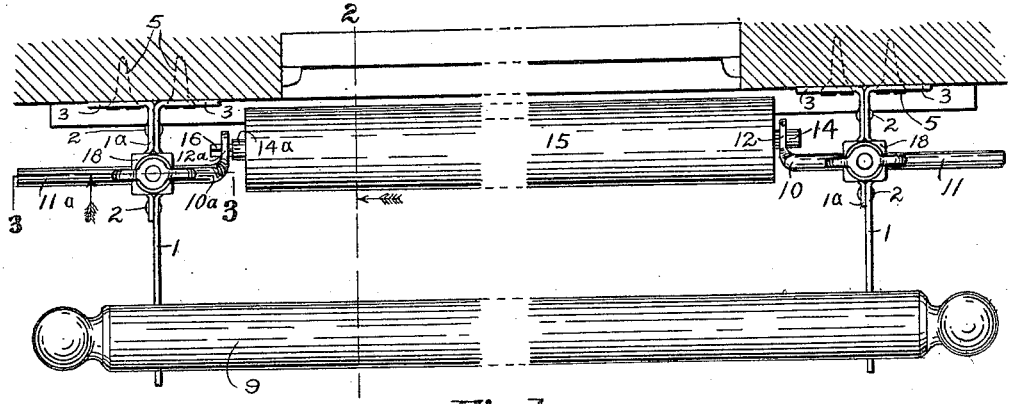
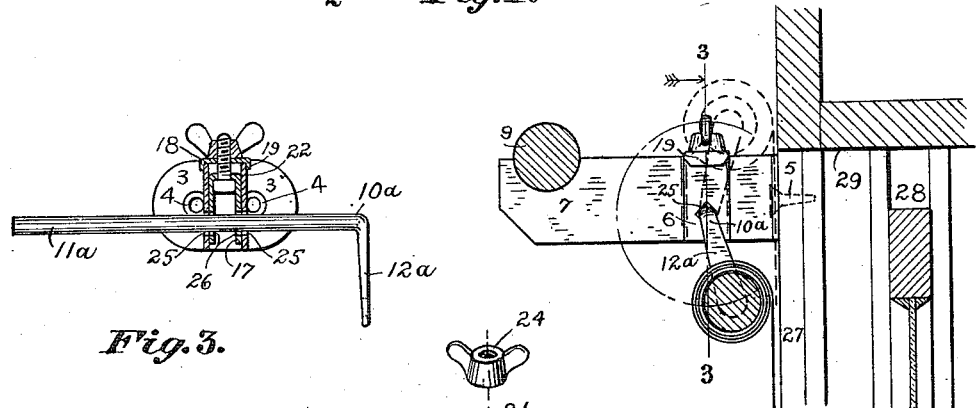
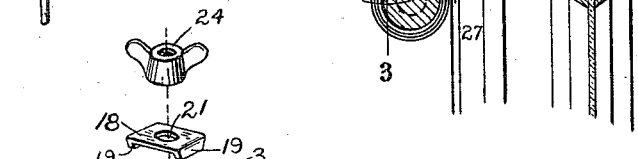
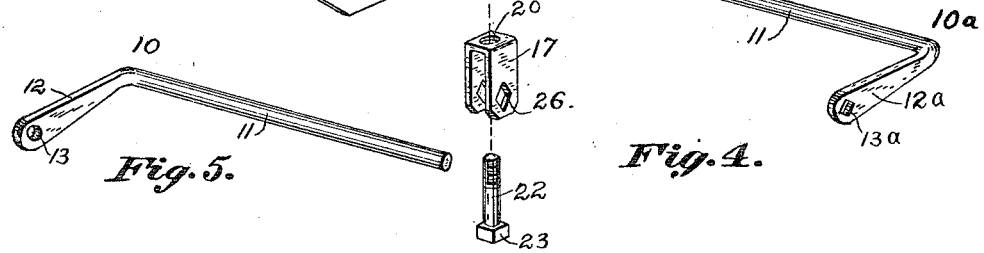
Witnesses:
Wm. R. Rhoads.
Ruth A. Miller.
Inventor:
John W. Winkleman,
By Harry Frease
Attorney.

UNITED STATES PATENT OFFICE.

JOHN W. WINKLEMAN, OF CANTON, OHIO.

SHADE AND CURTAIN BRACKET.

995,392.  Specification of Letters Patent.  Patented June 13, 1911.

Application filed November 26, 1909. Serial No. 529,890.

*To all whom it may concern:*

Be it known that I, JOHN W. WINKLEMAN, a citizen of the United States, residing at Canton, in the county of Stark and State of Ohio, have invented certain new and useful Improvements in Shade and Curtain Brackets, of which the following is a specification.

The invention relates to brackets for supporting shade sticks and curtain poles on windows; and the object of the improvements is to combine a holder for a shade-stick with a holder for a curtain-pole in such a manner that certain desirable adjustments of the stick with reference to the pole and the window-frame can be made at will, without disturbing either the curtain pole, or the bracket as a whole.

Further features of the invention relate to the construction of the brackets in all their parts out of sheet-metal and standard rods, bolts and nuts, so that a complete bracket can be made by stamping, punching and forging and without any machine work whatever.

These objects and purposes of the invention are attained by the preferred embodiment of the same set forth in the accompanying drawing, forming part hereof, in which—

Figure 1 is a plan view of a pair of brackets on a window, showing a shade stick and a curtain pole on the window frame; Fig. 2, a section of the same on line 2—2, Fig. 1; Fig. 3, a cross section of one bracket on line 3—3, Figs. 1 and 2; Fig. 4, a perspective view of the several parts of the bracket separated on lines for assembling, and Fig. 5, a detached perspective view of one shade-stick holder provided with an ordinary journal bearing.

Similar numerals refer to similar parts throughout the drawing.

The body of each bracket is composed of two similar plates of sheet-metal 1 and $1^a$ secured together by rivets 2 and having laterally bent securing flanges 3 on the inner ends provided with the screw apertures 4 for the heads of the securing screws 5. The body plates are bent laterally apart intermediate their ends to form the vertical barrel 6, which is open at its upper and lower ends and is preferably rectangular in cross section; from which barrel at least one of the plates is extended forward to form the arm 7 for holding the curtain pole, which arm is preferably provided with the semicircular notch 8 in which the curtain pole 9 is adapted to rest in the usual manner.

The shade holders 10 and $10^a$ are made with the preferably round rod stem portions 11 and $11^a$ and the radial shanks 12 and $12^a$, which shanks are bent substantially at right angles to the stem portion and are preferably forged flat and have the shade bearings 13 and $13^a$ punched in the free ends thereof. One of these bearings 13 is an ordinary journal bearing for the fixed pivot 14 usually provided on or in one end of the shade stick 15, and the other bearing $13^a$ is angular in form to fit the angular end 16 of the rotatable spring-pivot $14^a$ usually provided in the other end of the shade stick.

The yoke 17 is provided in the barrel 6 of the bracket-body, and is preferably made of a strip of sheet-metal bent in the form of an inverted U, and the cap 18 with the depending flanges 19 on the side edges, is provided on the upper end of the barrel; and the apertures 20 and 21 are provided in the upper end of the yoke and in the cap, through which apertures the inverted bolt 22 is passed from below upward, with its head 23 in the yoke and the thumb nut 24 above the cap, by means of which bolt and thumb nut the yoke is adapted to be drawn upward.

The stem of the shade-holder is entered through the apertures 25 and 26 which are provided in the side walls of the bracket barrel and the yoke, wherein it is adapted to be secured by turning the thumb nut on the bolt to draw the yoke upward, to clamp the stem between the lower edges of the yoke aperture and the upper edges of the barrel apertures; which apertures are preferably made in the form of vertically elongated diamonds, so that the stem is more securely wedged between the converging edges thereof.

In use, the shade-stick is mounted in the bearings provided in the shanks 12 and $12^a$ of the holders, by an endwise adjustment of the stems of the holders in the clamping apertures, which is permitted by loosening the thumb-nuts of the clamping bolts, after which the holder is clamped in position by tightening the nuts; and it is evident that the relative position of the shade stick with reference to the window-frame and the curtain-pole, may be changed at will, by rotating the shade-stick holder on its stem, which may be done by loosening the clamping bolt, and that the shade-stick will be held in any desired position of such adjustment by again tightening the bolt.

It is generally desirable to locate the shade-stick quite close to the window frame 27 and when the upper window sash 28 is slightly lowered, as during the night time, for the purpose of ventilation, the shade-stick is preferably swung downward adjacent to the window frame and below the lintel 29 thereof, as shown by full lines in Fig. 2; while in the day time, the shade-stick is preferably swung upward adjacent to the window frame above the lintel, thus completely shutting out the light, as shown by broken lines in the same figure. And in general, the shade-stick can be rotated on the stems of the holders as pivots to any desired position within the radius of the holder-shanks, without disturbing the curtain or its pole, and without removing the bracket from the window-frame.

I claim:

1. A bracket having a body-portion composed of two sheet-metal plates riveted together and being bent to form securing flanges on one end and a barrel intermediate the ends, an inverted U-shaped sheet-metal yoke in the barrel and a sheet-metal cap on the barrel, there being corresponding apertures in the sides of the yoke and the barrel, a shade-stick holder including a transverse stem adapted to rotate in the apertures, and a bolt through the yoke and the cap adapted to clamp the stem in the apertures.

2. A bracket having a body-portion composed of two sheet-metal plates riveted together and being bent to form securing flanges on one end and a barrel intermediate the ends, an inverted U-shaped sheet-metal yoke in the barrel and a sheet-metal cap on the barrel, there being corresponding diamond-shaped apertures in the sides of the yoke and the barrel, a shade-stick holder including a transverse stem adapted to rotate in the apertures, and a bolt through the yoke and the cap adapted to clamp the stem in the apertures.

JOHN W. WINKLEMAN.

Witnesses:
 CHAS. E. TINKLER,
 HARRY FREASE.

---

Copies of this patent may be obtained for five cents each, by addressing the "Commissioner of Patents. Washington, D. C."